(12) United States Patent
Lush

(10) Patent No.: US 8,082,881 B2
(45) Date of Patent: Dec. 27, 2011

(54) DOG FEEDER AND DOG WATERER

(76) Inventor: Raymon W. Lush, Bloomfield, NE (US)

( * ) Notice: Subject to any disclaimer, the term of this patent is extended or adjusted under 35 U.S.C. 154(b) by 17 days.

(21) Appl. No.: 12/655,039

(22) Filed: Dec. 22, 2009

(65) Prior Publication Data

US 2010/0101498 A1 Apr. 29, 2010

Related U.S. Application Data

(63) Continuation-in-part of application No. 11/640,596, filed on Dec. 18, 2006.

(51) Int. Cl.
*A01K 5/01* (2006.01)
*A01K 7/00* (2006.01)
(52) U.S. Cl. .................................. 119/51.5; 119/61.56
(58) Field of Classification Search ............... 119/61.56, 119/61.5, 63, 51.5, 54, 74
See application file for complete search history.

(56) References Cited

U.S. PATENT DOCUMENTS

| 845,982 | A | * | 3/1907 | Smith | 119/53.5 |
|---|---|---|---|---|---|
| 939,533 | A | | 9/1909 | Myers | |
| 2,738,893 | A | * | 3/1956 | Quinones, Jr. | 220/23.4 |
| 4,962,730 | A | * | 10/1990 | Schafer | 119/73 |
| 5,427,262 | A | * | 6/1995 | Hanson et al. | 220/23.4 |
| 5,588,394 | A | | 12/1996 | Balistreri | |
| 5,615,765 | A | * | 4/1997 | Roericht | 206/45.23 |
| 5,649,499 | A | | 7/1997 | Krietzman et al. | |
| 5,752,464 | A | * | 5/1998 | King et al. | 119/63 |
| 5,884,580 | A | * | 3/1999 | Faircloth, Jr. | 119/51.5 |
| 5,947,056 | A | * | 9/1999 | Zarski | 119/61.56 |
| 7,263,949 | B1 | * | 9/2007 | Seaford | 119/51.5 |

* cited by examiner

*Primary Examiner* — Rob Swiatek
*Assistant Examiner* — Ebony Evans
(74) *Attorney, Agent, or Firm* — Dennis L. Thomte; Thomte Patent Law Office LLC

(57) ABSTRACT

A dog feeder and dog waterer is provided wherein the dog feeder and dog waterer may be moved individually from operative positions to stored positions and which may be detachably secured together when in their stored or transport positions to enable the feeder and waterer to be carried as a unit and to add stability of the same during transport or storage.

3 Claims, 6 Drawing Sheets

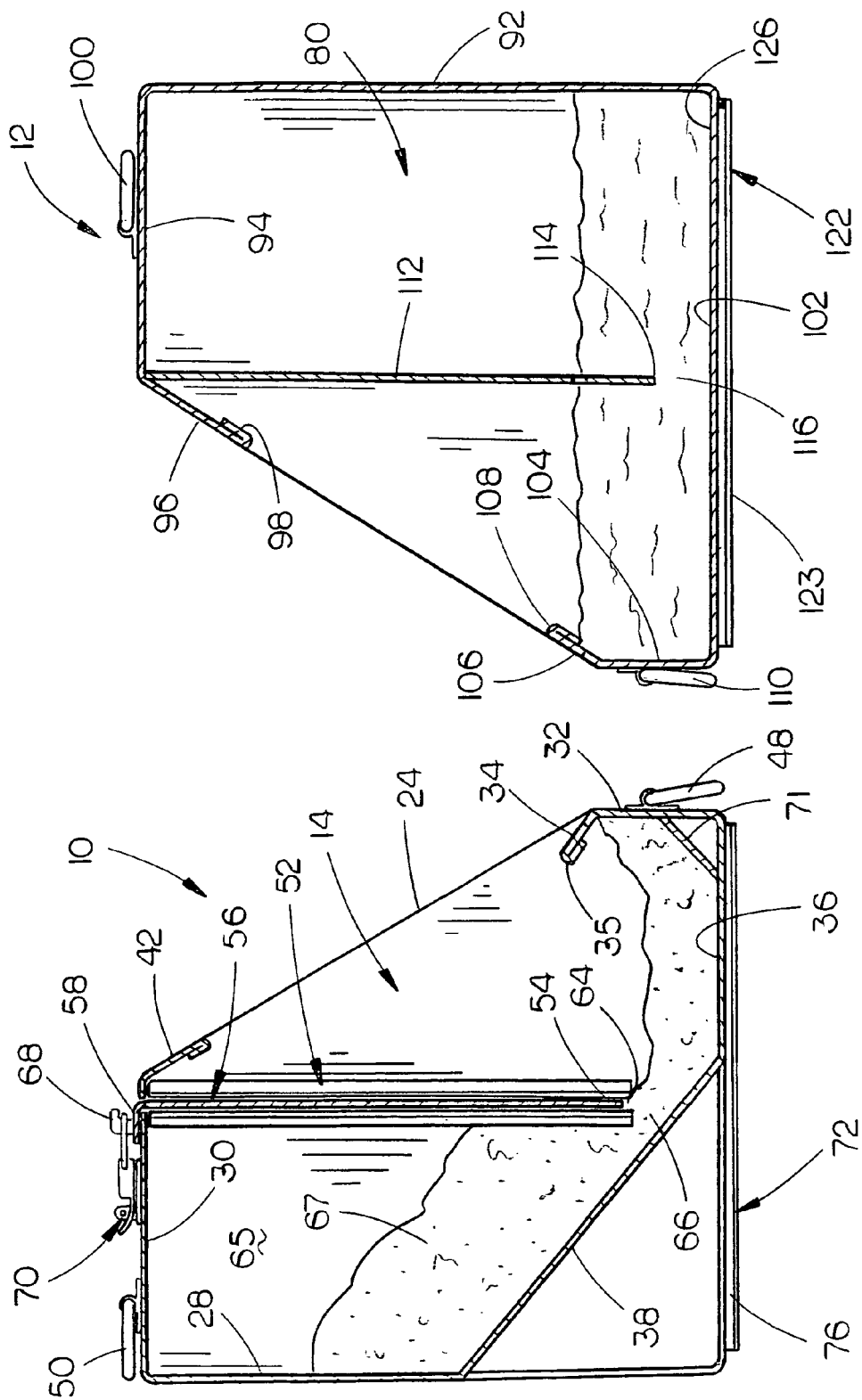

DOG FEEDER AND DOG WATERER

CROSS-REFERENCE TO RELATED APPLICATION

This is a continuation-in-part application of Ser. No. 11/640,596 filed Dec. 18, 2006 entitled DOG FEEDER.

BACKGROUND OF THE INVENTION

1. Field of the Invention

This invention relates to a pet feeder and pet waterer and more particularly to a dog feeder and dog waterer. Even more particularly, the invention relates to a portable dog feeder and a portable dog waterer which may be conveniently used on hunting or dog training trips. Even more particularly, the invention relates to a dog feeder and a dog waterer which may be selectively connected together to facilitate the carrying of the same as a unit and which adds to the stability of the same when in their storage or transport positions.

2. Description of the Related Art

When a hunting dog is taken to the field for training or hunting, it is necessary to be able to feed the dog in the field. Heretofore, the dog owner would usually bring a bag of dry dog food and a bowl in which the dog food would be placed for consumption by the dog. The dog, in its haste to eat, frequently overturns the bowl which creates a mess and which sometimes wastes feed. Further, if the dog does not consume all the food in the bowl, the remaining food is usually discarded or returned to the dog food bag.

Further, it is also necessary to be able to provide drinking water for the dog in the field. Normally, the dog owner would usually bring a container of drinking water and a bowl in which the drinking water is placed for consumption by the dog. The dog frequently overturns the bowl which also creates a mess and which wastes water. Further, if the dog does not consume all the water in the bowl, the remaining water is usually discarded or returned to the water container.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

This invention relates to a dog feeder and a dog waterer with the same being selectively connected together for transport or storage purposes and which also adds stability to the unit when in its transport or storage position. The dog feeder portion of the invention comprises a lower end, an upper end, a first side, a second side, a forward end and a rearward end. The dog feeder includes a first upstanding side wall having a lower end, an upper end, a forward end, and a rearward end. The dog feeder also includes a second upstanding side wall which is horizontally spaced from the first side wall and which has a lower end, an upper end, a forward end, and a rearward end. A bottom wall extends between the first and second side walls of the lower forward ends thereof. An inclined wall extends upwardly and rearwardly from the bottom wall rearwardly of the forward end thereof. It also includes an upstanding front wall, having upper and lower ends, which extends between the lower forward ends of the first and second side walls at the forward end of the bottom wall. The dog feeder also includes an upstanding back wall which extends between the first and second side walls with the upper rearward end of the inclined wall being joined to the back wall. The upper ends of the first and second side walls on the back wall are closed by a top wall or by a suitable cover. The dog feeder also includes an upstanding panel having upper and lower ends and first and second side edges with the panel extending downwardly from the top wall between the first and second sides to define a feed compartment with the lower end of the panel being spaced above the inclined wall and the bottom wall to define a feed discharge opening therebetween. The front wall, first and second side walls and the bottom wall form a feed tray area which receives feed from the feed compartment through the discharge opening and which permits feed therein to flow through the feed discharge opening back into the feed compartment when the dog feeder is tipped so that the back wall thereof is positioned in a horizontally disposed attitude.

The dog waterer portion of the invention has a lower end, an upper end, a first side, a second side, a forward end and a rearward end. The dog waterer includes a first upstanding side wall, having a lower end, an upper end, a forward end, and a rearward end. The dog waterer also includes a second upstanding side wall horizontally spaced from the first side wall which has a lower end, an upper end, a forward end, and a rearward end. A bottom wall, having a forward end, a rearward end, a first side and a second side extends rearwardly from the lower end of the front wall between the first and second side walls. An upstanding front wall, having upper and lower ends, extends between the lower forward ends of the first and second side walls at the forward end of the bottom wall. An upstanding back wall extends between the first and second side walls. A top wall is provided at the upper ends of the first and second side walls and the back wall. An upstanding panel, having upper and lower ends and first and second sides, extends downwardly from the top wall between the first and second sides to define a water compartment or reservoir with the lower end of the panel being spaced above the bottom wall to define a water discharge opening.

The front wall, first and second sides, and bottom wall of the dog waterer forms a water tray area which receives water from the water compartment through the discharge opening and which permits water therein to flow through the discharge opening back into the water compartment when the dog waterer has been tipped so that the back wall is positioned in a horizontally disposed attitude.

The bottom walls of the dog feeder and dog waterer are capable of being selectively secured together when the back walls thereof are positioned in a horizontally disposed attitude with the bottom walls thereof being positioned adjacent one another in a vertically disposed attitude.

It is therefore a principal object of the invention to provide an improved dog feeder and dog waterer which may be selectively secured together to facilitate the storage and transport thereof.

A further object of the invention is to provide a dog feeder and dog waterer of the type described which when secured together in their stored or transport position adds stability to the unit.

A further object of the invention is to provide a dog feeder and dog waterer which may be selectively secured together for storage or transport position.

A further object of the invention is to provide a dog feeder and dog waterer which may be selectively positioned in a feeding position or tipped from the feeding position to a storage and transport position.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a sectional view of the dog feeder;

FIG. 4 is a sectional view of the dog waterer;

DESCRIPTION OF THE PREFERRED EMBODIMENT

Figure 1:
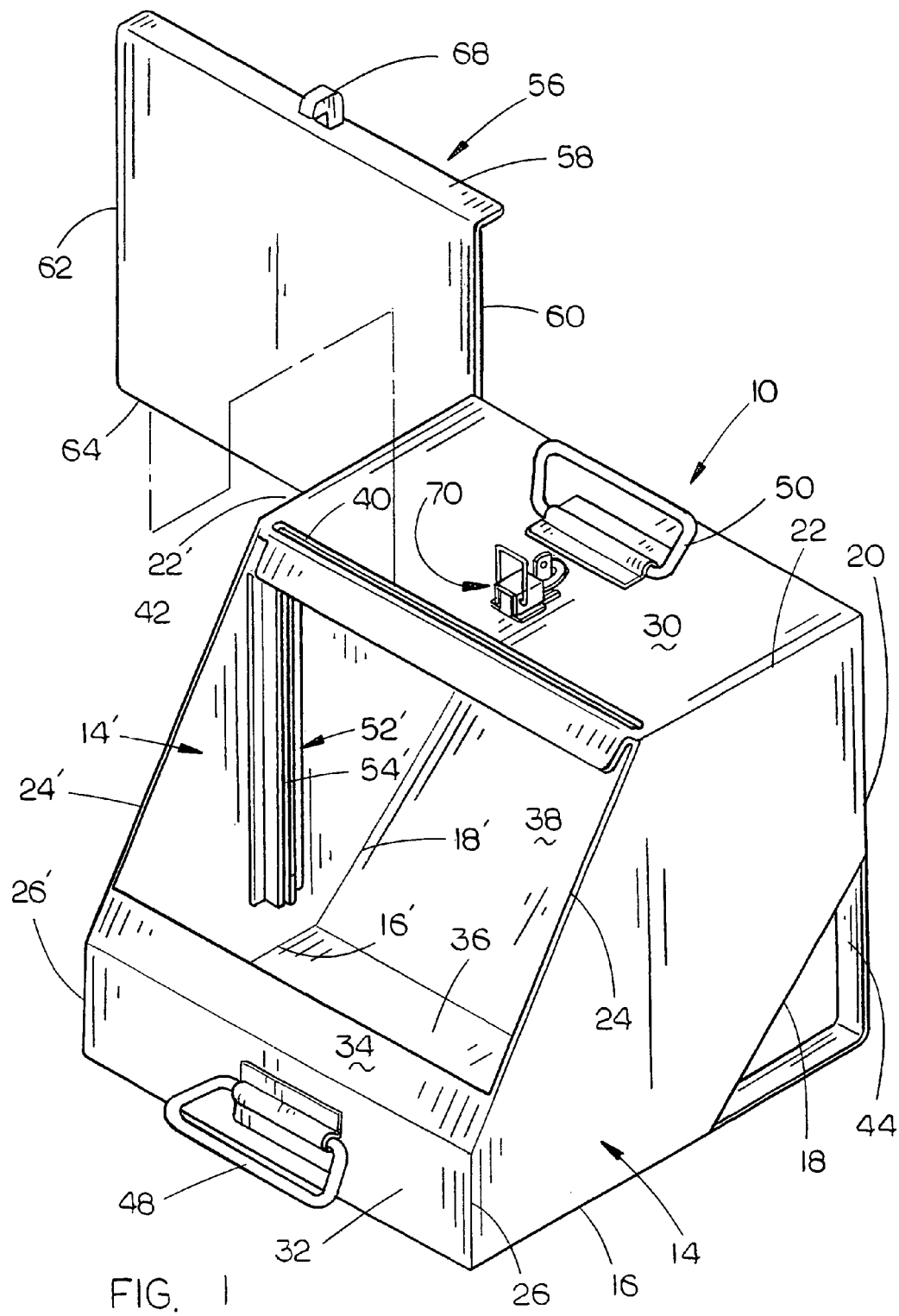
FIG. 1 is a front exploded perspective view of the dog feeder portion of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The dog feeder portion of this invention is designated by the reference numeral 10 while the dog waterer portion of this invention is designated by the reference numeral 12.

Figure 2:
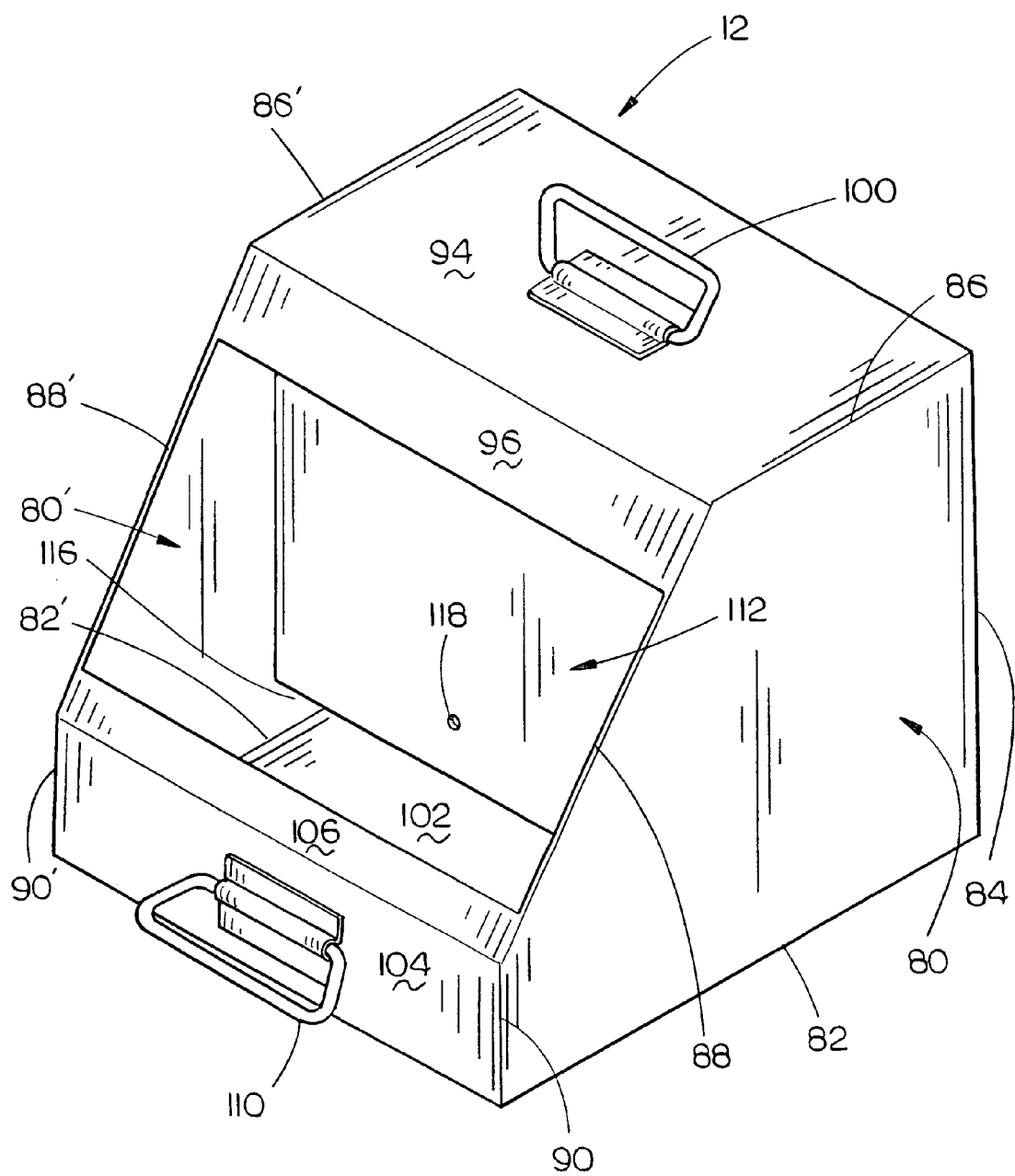
FIG. 2 is a front perspective view of the dog waterer portion of this invention.
Figure 5:
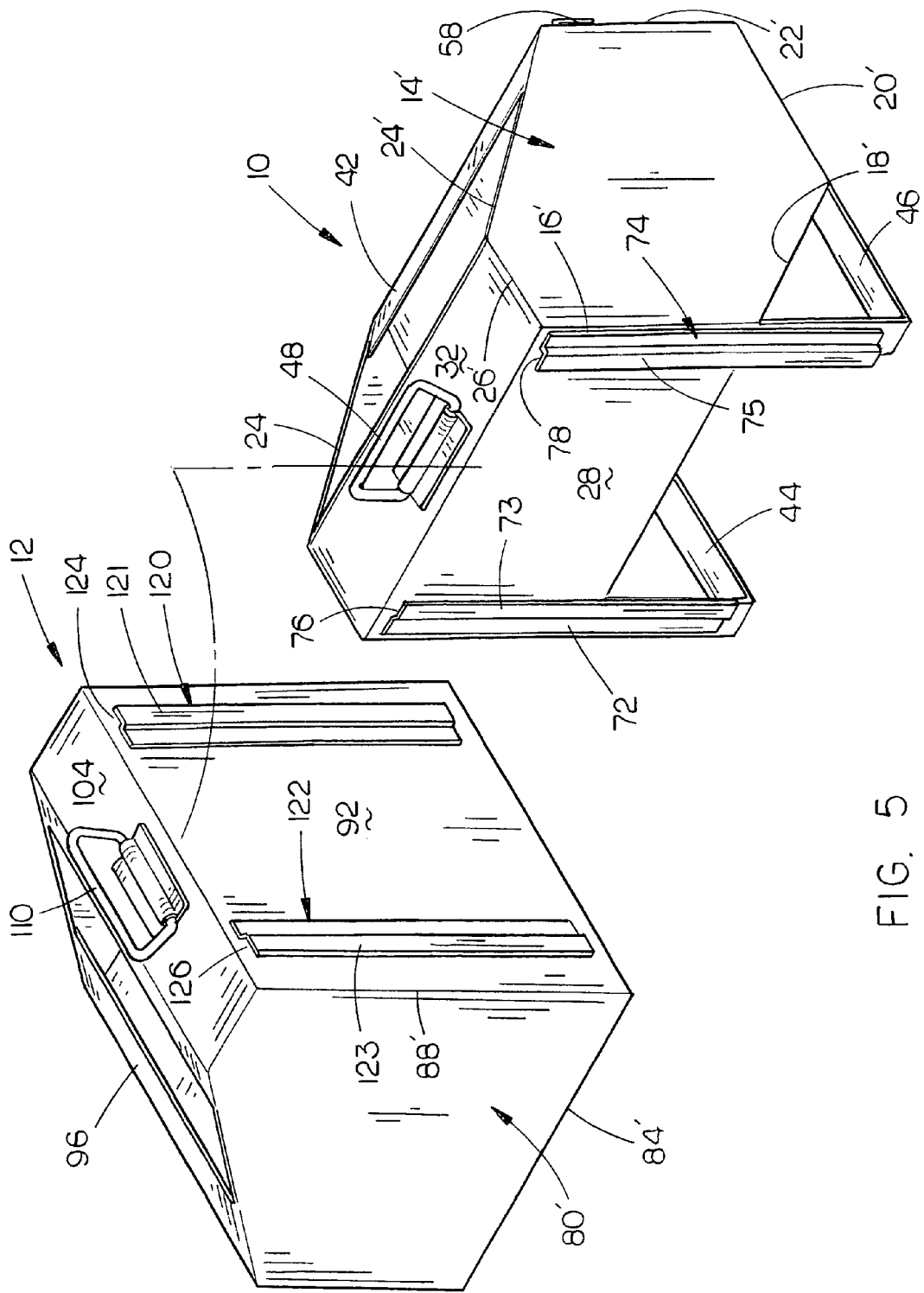
FIG. 5 is a perspective view of the dog feeder and dog waterer with the broken lines illustrating the manner in which the dog feeder and dog waterer may be secured together so as to be carried as a single unit or stored as a single unit.

FIG. 1 illustrates the dog feeder 10 in its feeding position and FIG. 2 illustrates the dog waterer in its drinking position. For purposes of description, the dog feeder 10 and dog waterer 12 will be described as being in their feeding and drinking positions respectively. For purposes of description, dog feeder 10 will be described as including a first side wall 14 having a bottom edge 16, an inclined edge 18 extending upwardly and rearwardly from the rearward end of bottom edge 16, a back edge 20 extending upwardly from the rearward end of inclined edge 18, an upper edge 22 which extends forwardly from the upper end of back edge 20, an inclined edge 24 extending downwardly and forwardly from the forward end of upper edge 22, and a front edge 26 extending downwardly from the forward end of inclined edge 24 to the forward end of bottom edge 16.

Dog feeder 10 also includes a second side wall 14' having a bottom edge 16', an inclined edge 18' extending upwardly and rearwardly from the rearward end of bottom edge 16', a back edge 20' extending upwardly from the rearward end of inclined edge 18', an upper edge 22' extending forwardly from the upper end of back edge 20', an inclined edge 24' extending downwardly and forwardly from the forward end of upper edge 22', and a front edge 26' extending downwardly from the forward end of inclined edge 24' to the forward end of bottom edge 16'.

Dog feeder 10 further includes a back wall 28, a top wall 30, a front wall 32 which has an upwardly and rearwardly inclined upper end portion 34, a horizontally extending bottom wall 36 which extends rearwardly from the lower end of front wall 32 between side walls 14 and 14' to the lower forward end of an inclined wall member 38 which extends upwardly and rearwardly from the rearward end of bottom wall 36 to the lower end of back wall 28. Top wall 30 has an elongated slot 40 formed therein rearwardly of the inclined lip 42 which extends downwardly and forwardly from the forward end of top wall 30. Dog feeder 10 further includes a pair of L-shaped legs 44 and 46 at the lower rearward end thereof as seen in the drawings.

Dog feeder 10 preferably has pivotal handles 48 and 50 secured to the front wall 32 and top wall 30 respectively. An elongated vertically disposed guide 52 is secured to the inside surface of side wall 14 and has a vertically disposed slot 54 formed therein, the upper end of which registers with one end of the slot 40. An elongated vertically disposed guide 52' is secured to the inside surface of side wall 14' and has a vertically disposed slot 54' formed therein, the upper end of which registers with the other end of slot 40.

The numeral 56 refers to a vertically disposed intermediate wall, panel or gate having a rearwardly extending flange 58 at its upper end. Panel 56 is slidably extended downwardly through slot 40 with its side edges 60 and 62 being received by the slots 54 and 54' respectively in the guides 52 and 52' respectively. When panel 56 is positioned in the guides 52 and 52', the flange 58 thereof rests on the forward end of top wall 30. The walls 14, 14', 28, 30, 38 and panel 56 define a food compartment 65 adapted to contain feed 67 therein. When in its fully lowered position with flange 58 resting on top wall 30, the lower end 64 of panel 58 is spaced above the inclined wall 38 as seen in FIG. 3 to provide a feed discharge opening 66 therebetween.

A hook 68 is provided on flange 58, as seen in FIG. 1, which is adapted to be selectively secured to the locking assembly 70 mounted on the upper surface of top wall 30 to lock panel 56 in its fully lowered position. When the panel 56 is in it fully lowered position, the guides 52 and 52' provide a leak-proof seal therebetween. As seen in FIG. 3, an inclined wall 71 is positioned within the lower forward end of the feeder to prevent feed from sticking in the juncture of the bottom wall 38 and the front wall 32. The wall 71 extends between the side walls 14 and 14'.

In some designs, panel 56 may be fixed to the feeder rather than being selectively mounted thereon. In some designs, the top wall 30 will be replaced by a removable cover such as disclosed in the co-pending application.

A pair of elongated Z-shaped or S-shaped connectors 72 and 74 are secured to the exterior surface of bottom wall 38 and the exterior surface of a portion of the leg 44 or 46 associated therewith. The connectors 72 and 74 include inwardly facing channels 76 and 78 respectively.

The dog waterer 12 includes a first side wall 80 having a bottom edge 82, a back edge 84 which extends upwardly from the rearward end of bottom edge 82, upper edge 86, inclined edge 88, and front edge 90. Second side wall 80' includes a bottom edge 82', back edge 84', upper edge 86', inclined edge 88' and front edge 90'. Dog waterer 12 also includes an upstanding back wall 92 which extends between the back edges 84 and 84' of side walls 80 and 80' respectively. Top wall 94 extends forwardly from the upper end of back wall 92 between the upper edges 86 and 86' of side walls 80 and 80' respectively. An inclined wall 96 extends downwardly and forwardly from the forward end of top wall 94 with the lower end thereof bent upon itself at 98 to form a handle for a gripping portion as will be explained hereinafter. Preferably, a pivotal handle 100 is mounted on top wall 94 as seen in FIG. 2.

Dog waterer 12 further includes a bottom wall 102 which is secured to the bottom edges of side walls 80 and 82' as well as back wall 92. An upstanding front wall 104 is positioned between the front edges 90 and 90' and the front edge of bottom wall 102. An inclined wall 106 extends upwardly and rearwardly from the upper end of front wall 104 and has its upper edge or end bent upon itself at 108 to form a handle or gripping portion as will be described hereinafter. Preferably, a pivotal handle 110 is mounted on front wall 104 as seen in FIG. 2.

An upstanding intermediate wall or panel 112 has its upper end secured to the underside of top wall 94 at the forward end thereof (FIG. 4) and extends between the inner surfaces of side walls 80 and 80'. The lower end 114 of intermediate wall 112 is spaced above the bottom wall 102 to define a water discharge opening 116 therebetween. Preferably, intermediate wall 112 has an opening 118 formed therein as seen in FIG. 2. A pair of elongated Z-shaped or S-shaped connectors 120 and 122 are secured to the exterior surface of bottom wall 102 and extend between the forward and the rearward ends thereof and which include offset portions 121 and 123 respectively to form outwardly facing channels 124 and 126 respectively. The lower ends of channels 124 and 126 are closed for a purpose to be discussed hereinafter.

The side walls 80, 80' together with the back wall 92, the rearward end of back wall of back wall 102, intermediate wall 112 and top wall 94 define a water reservoir or water compartment 128 adapted to contain water 130.

When it is desired to place feed 67 in the feeder 10, the panel 56 is unlocked and is slidably moved upwardly. Usually, the feeder will then be tipped so that the back wall 28 is in a substantially horizontally disposed position. Feed may then be poured into the compartment 65. At that time, the panel 52 will then be slidably moved downwardly to its lowermost position and the panel 52 will be locked in that position by the locking device 70. The feeder will then be tipped back to the position of FIG. 3 so that the feed 67 will flow downwardly through the discharge opening 66 into the feed tray portion of the feeder. The dog may then consume the feed in the tray area.

When it is desired to prevent further feeding of the dog or it is desired to store or transport the feeder, the feeder 10 will be tipped 90° to the left as viewed in FIG. 3 so that the back wall 28 will be in a horizontally disposed position. As the feeder is tipped from the position of FIG. 3 to the position of FIG. 6, the feed in the tray area will flow therefrom through the discharge opening 66 back into the feed compartment 65.

When it is desired to fill the dog waterer 12 with water, the dog waterer 12 will be tipped from the position of FIG. 4 90° so that the back wall 92 is in a horizontally disposed position. Water is then poured into the water compartment or reservoir 128 through the discharge opening 116. When sufficient water has been placed in the water compartment 128, the dog waterer 12 will then be tipped back to the position of FIG. 4 so that water may flow from the water compartment 128 into the tray area forwardly of the immediate wall 112. When it is desired to discontinue the supply of water to the dog or it is desired to transport or store the dog waterer 12, the dog waterer 12 is tipped from the position of FIG. 4 90° to the right as viewed in FIG. 4 so that back wall 92 is horizontally disposed. As the dog waterer is tipped from the position in FIG. 4 to the position of FIG. 6, water within the tray area will flow back into the water compartment 28 through the opening 116. At that time, the dog will not be able to have access to water.

To facilitate the stability of the units during their storage or transport positions and to enable the dog feeder 10 and the dog waterer 12 to be connected together and carried as a unit, the dog feeder 10 and dog waterer 12 will be tipped from the positions of FIGS. 1 and 2 respectively with the dog feeder 10 then being connected to the dog waterer 12 by positioning the connectors 72 and 74 of dog feeder 10 directly above the connectors 120 and 122 and respectively and then slidably moving the portions 73 and 75 of connectors 72 and 74 respectively downwardly through the channels 124 and 126 of connectors 120 and 122 respectively. At that time, the dog feeder 10 and the dog waterer 12 will be connected together so as to be carried as a unit or stored as a unit. When it is desired to carry the ?? unit, the dog handler grasps the handle 110 or the end 108 of wall 106 to raise the dog feeder 12. Since the lower ends of the channels 124 and 126 of connectors 120 and 122 respectively are closed, lifting of the dog waterer 12 will cause the dog feeder 10 to be lifted thereby since the lower ends of the portions 73 and 75 of connectors 72 and 74 will engage the closed lower ends of the channels 124 and 126 of connectors 120 and 122 respectively.

Figure 6:
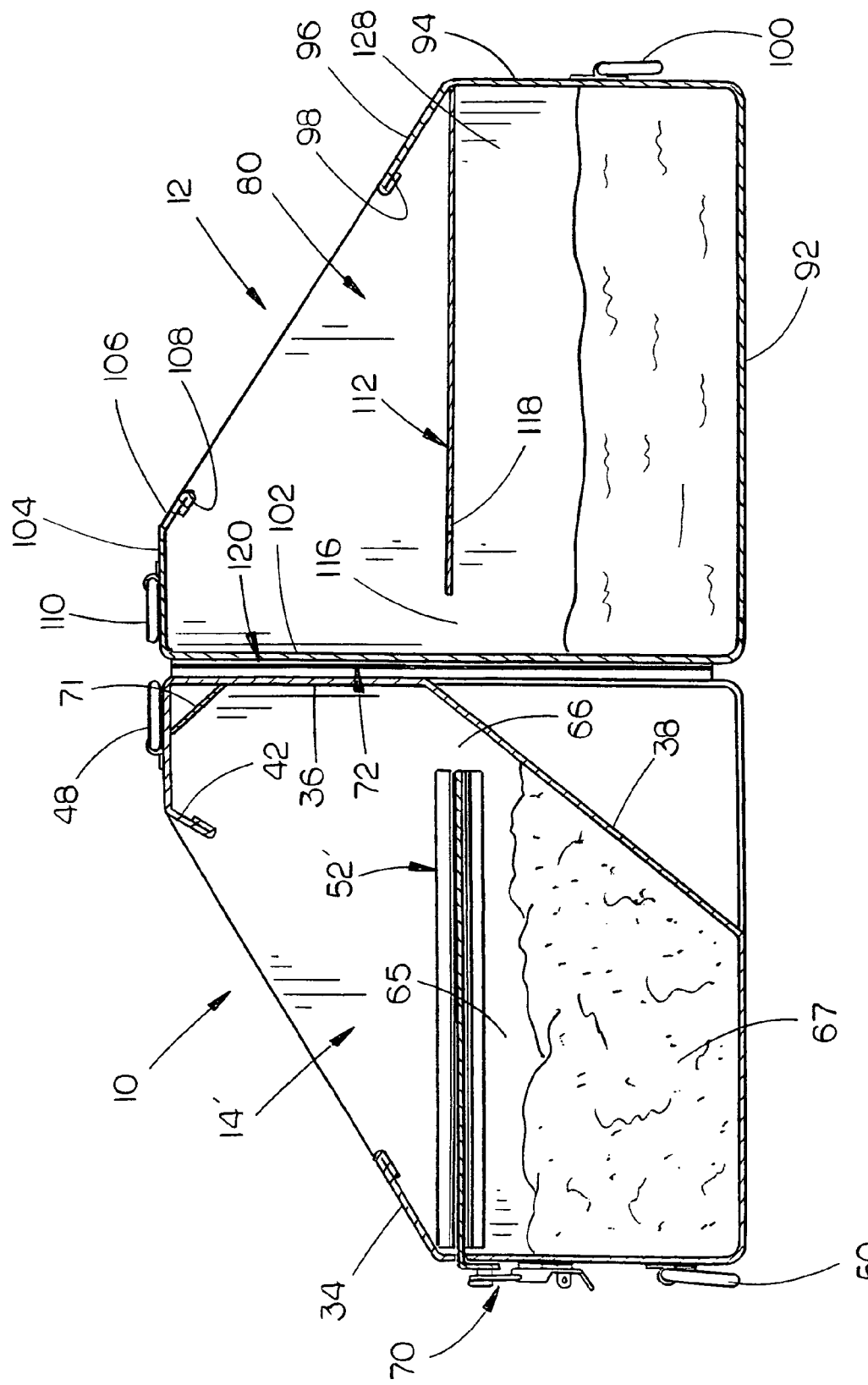
FIG. 6 is a sectional view illustrating the dog feeder and dog waterer being tipped from the positions of FIGS. 3 and 4 respectively and secured together to form a single unit.
Figure 7:
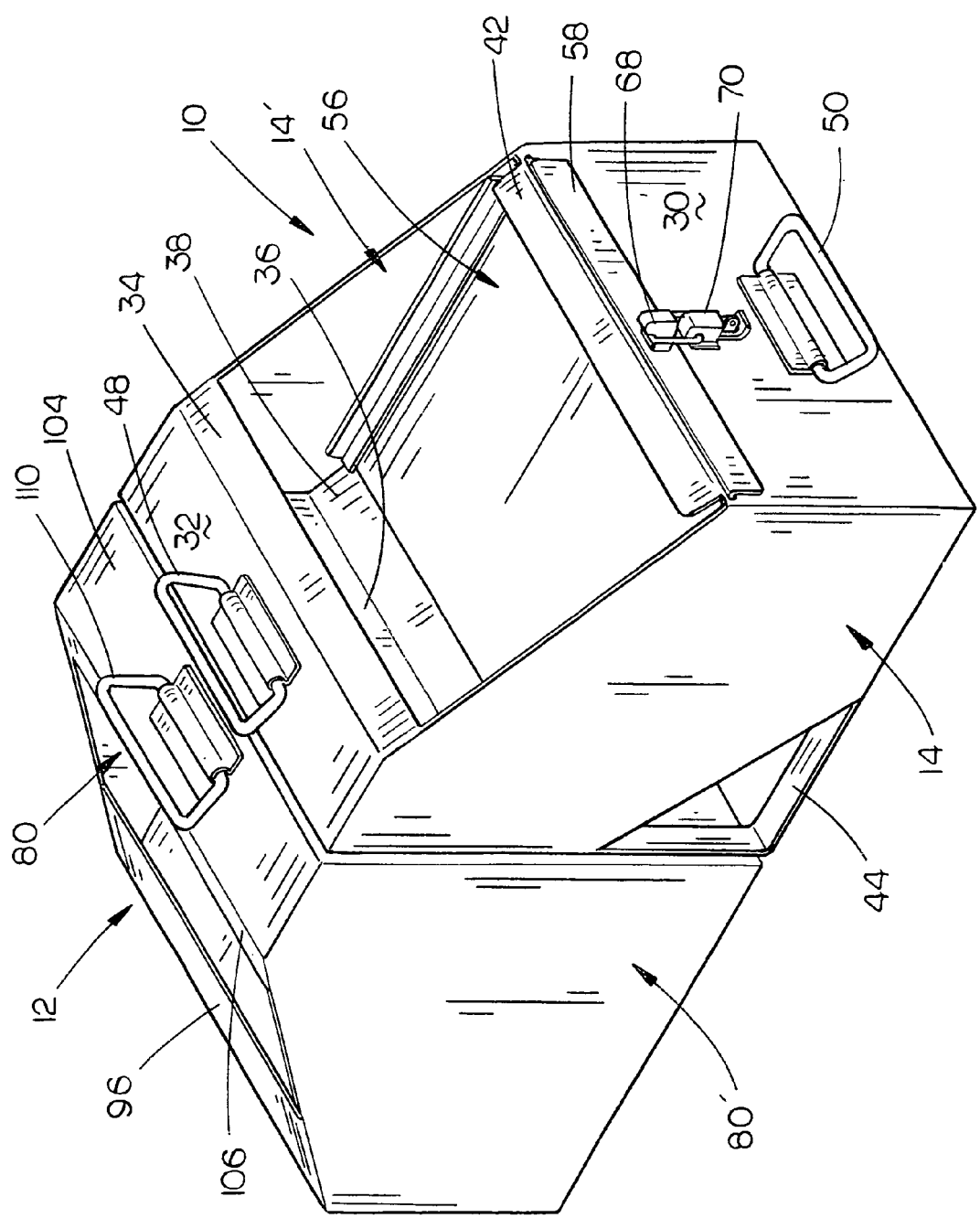
FIG. 7 is a perspective view of the dog feeder and dog waterer secured together for transport or storage.

Thus, it can be seen that the ability to connect the dog feeder 10 and the dog waterer 12 together provides a convenient means of carrying or transporting the same as a unit. Further, when the dog feeder 10 and the dog waterer 12 are secured together as illustrated in FIG. 6, the connection of the same adds stability to the unit since it would be more difficult for a dog to overturn the unit. Further, the unit will be more stable against tipping during movement of the vehicle which the unit will normally be transported.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a dog feeder having a lower end, an upper end, a first side, a second side, a forward end and a rearward end;
said dog feeder including;
(a) a first upstanding side wall having a lower end, an upper end, a forward end, and a rearward end;
(b) a second upstanding side wall horizontally spaced from said first side wall and having a lower end, an upper end, a forward end, and a rearward end;
(c) a bottom wall having a forward end, a rearward end, a first side and a second side, side bottom wall extending between said first and second side walls at the lower forward ends thereof;
(d) an inclined wall having a lower forward end and an upper rearward end, said inclined wall extending upwardly and rearwardly from said bottom wall rearwardly of the forward end thereof;
(e) an upstanding front wall, having upper and lower ends, extending between the lower forward ends of said first and second side walls at the forward end of said bottom wall;

(f) an upstanding back wall, having a lower end, an upper end and first and second sides, extending between said first and second side walls;
(g) said upper rearward end of said inclined wall being joined to said back wall;
(h) a top wall at the upper ends of said first and second side walls and said back wall;
(i) an upstanding panel having upper and lower ends and first and second sides; said panel extending downwardly from said top wall between said first and second sides to define a feed compartment, said lower end of said panel being spaced above said inclined wall and said bottom wall to define a feed discharge opening;

said front wall, said first and second side walls, and said bottom wall forming a feed tray area which receives feed from said feed compartment through said discharge opening and which permits feed therein to flow through said feed discharge opening back into said feed compartment when the dog feeder is tipped so that said back wall thereof is positioned in a horizontally disposed attitude;

said bottom wall of said dog feeder having a pair of spaced-apart elongated connectors secured thereto which extend from said forward end thereof towards said rearward end thereof;

each of said elongated connectors which are secured to said bottom wall of said dog feeder including elongated inwardly facing channels;

a dog waterer having a lower end, an upper end, a first side, a second side, a forward end and a rearward end;

said dog waterer including:
(a) a first upstanding side wall having a lower end, an upper end, a forward end, and a rearward end;
(b) a second upstanding side wall horizontally spaced from said first side wall and having a lower end, an upper end, a forward end, and a rearward end;
(c) a bottom wall having a forward end, a rearward end, a first side and a second side, said bottom wall extending rearwardly from said lower end of said front wall between said first and second side walls;
(d) an upstanding front wall, having upper and lower ends, extending between the lower forward ends of said first and second side walls at the forward end of said bottom wall;
(e) an upstanding back wall, having a lower end, an upper end and first and second sides, extending between said first and second side walls;
(f) a top wall at the upper ends of said first and second side walls and said back wall;
(g) an upstanding panel having upper and lower ends and first and second sides; said panel extending downwardly from said top wall between said first and second sides to define a water compartment, said lower end of said panel being spaced above said bottom wall to define a water discharge opening;

said front wall, said first and second sides, and said bottom wall forming a water tray area which receives water from said water compartment through said discharge opening and which permits water therein to flow through said water discharge opening back into said water compartment when said dog waterer has been tipped so that said back wall is positioned in a horizontally disposed attitude;

said bottom wall of said dog waterer having a pair of spaced-apart elongated connectors secured thereto which extend from said forward end thereof towards said rearward end thereof;

each of said elongated connectors which are secured to said bottom wall of said dog waterer including elongated outwardly facing channels;

said elongated channels of said pair of elongated connectors on said bottom wall of said dog feeder being capable of being slidably connected to said elongated channels of said pair of elongated connectors on said bottom wall of said dog waterer when said back walls of said dog feeder and said dog waterer are positioned in horizontally disposed attitude with said bottom walls of said dog feeder and said dog waterer being positioned adjacent one another in a vertically disposed attitude for storage or transport.

2. The combination of claim 1 wherein said front wall of said dog waterer has an opening formed therein above the lower end thereof.

3. The combination of claim 1 wherein said dog feeder and said dog waterer may be carried as a unit by grasping one of said dog feeder and said dog waterer when secured together.

* * * * *